UNITED STATES PATENT OFFICE.

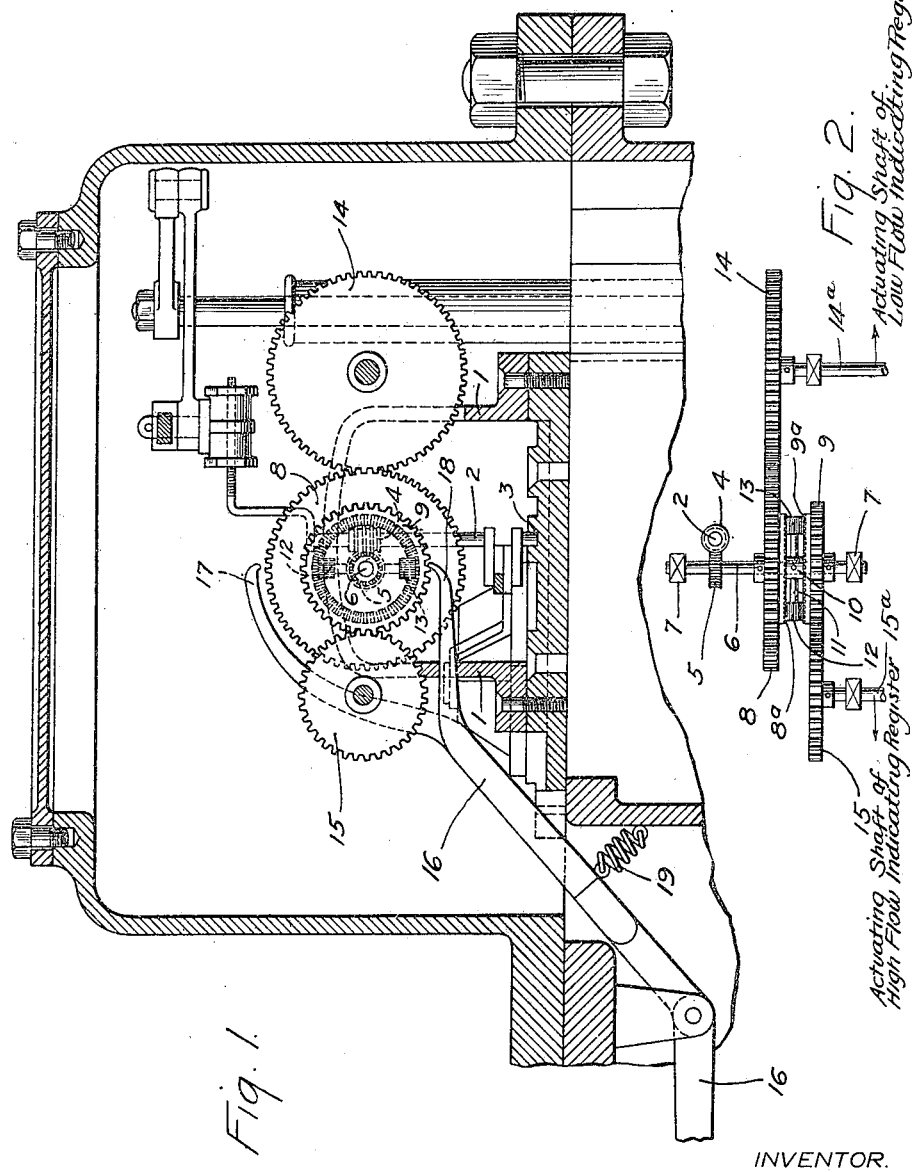

HORACE CHRISMAN, OF EDGEWOOD, PENNSYLVANIA, ASSIGNOR TO PITTSBURGH METER COMPANY, A CORPORATION OF PENNSYLVANIA.

GEARING.

1,204,251.  Specification of Letters Patent.  Patented Nov. 7, 1916.

Original application filed December 7, 1910, Serial No. 596,018. Divided and this application filed February 4, 1913. Serial No. 746,109.

*To all whom it may concern:*

Be it known that I, HORACE CHRISMAN, a citizen of the United States, and a resident of Edgewood, in the county of Allegheny and State of Pennsylvania, have made a new and useful Invention in Gearing, of which the following is a specification.

This invention relates to meters and is a division of my application Serial No. 596,018, filed December 7, 1910.

One object of the invention is to provide a registering mechanism for proportional fluid meters and the like which may be employed to register the entire volume of small flows and which may be employed to register the entire volume passed through on large flows.

Another object of the invention is to provide means whereby the volume both of small and large flows may be measured by one tally meter.

Figure 1 is a front elevational view of the registering mechanism, and Fig. 2 is a plan view of the gearing thereof.

Referring now to the drawings by numerals of reference: 1 is a yoke or frame in which is journaled a crank shaft 2, said shaft 2 also being journaled in the step-bearing 3 in the floor of the casing which surrounds it. On the shaft 2 (of the usual meter valve operating links) is a worm gear 4, meshing with a worm-wheel 5 on the horizontal shaft 6, mounted in suitable bearings 7 carried by said yoke 1. The shaft 6 is provided with a differential gear which includes two registering gears 8 and 9 shown as having crown teeth $8^a$ and $9^a$ on their inner faces. The gears 8 and 9 are loose on the shaft 6 but a sleeve 10 interposed between them is fast on the shaft 6 and this sleeve carries a pinion shaft 11, on which are pinions 12 and 13 meshing with the teeth $8^a$ and $9^a$ of the gears 8 and 9. The gear 8 meshes with the gear 14 which operates the low flow indicator and the gear 9 meshes with the gear 15 which operates the high or proportional indicator flow.

It is one of the purposes of this invention to prevent operation of the high flow mechanism when low flow mechanism is being operated and vice versa. This may be accomplished by the position of the lever 16, which as indicated in application Serial No. 596,018, filed December 7, 1910, is controlled by a diaphragm. The lever 16 is provided with a double pawl having teeth 17 and 18. The tooth 17 is adapted to engage the toothed wheel 8, when the diaphragm is raised so that the low flow mechanism will be cut off and at the same time the tooth 18 will release the toothed wheel 9 and permit the high flow mechanism to register. If the free end of the lever 16 is down, the tooth 17 will move out of engagement with the wheel 8, but the tooth 18 will move into engagement with the wheel 9 so that the low flow mechanism will register but the high flow mechanism will be held against movement. The lever 16 is provided with a spring 19 to normally hold it in the proper operative position.

The shaft 6 is driven through the agency of the worm 4 by the meter-driven shaft 2. This drives the sleeve 10 on which the pinions 12 and 13 are mounted. When the gear 9 is held stationary by the lever 16, the gears 12 and 13 are caused to rotate by their engagement with the crown teeth $9^a$ and their rotation imparts motion to the wheel 8 through the crown teeth $8^a$. On the other hand, when the gear 8 is held stationary and the gear 9 is released, the rotation of the shaft 6 causes the gears 12 and 13 to roll with relation to the crown teeth $8^a$ and to thereby impart rotation to the gear $9^a$.

From the foregoing it will be seen that a single operating mechanism is provided for controlling the effective operation of either the high flow indicating mechanism or the low flow indicating mechanism.

Having thus described my invention, what I claim is:

1. A differential mechanism, comprising a shaft, two actuating gears loosely mounted on said shaft, an arm carried by the shaft, a pinion meshing with each of said gears and journaled on said arm, and actuated means for engaging one gear and holding it against rotation and for simultaneously releasing the other.

2. A differential mechanism, comprising a driven shaft, actuating wheels loosely mounted on the shaft, a differential pinion carried by the shaft and engaging both of said wheels, and a lever provided with two pawls each for engaging one of said wheels for holding it against rotation, said pawls being so arranged on said lever that one wheel is released simultaneously with the engagement of the other.

3. A differential registering mechanism, comprising a shaft, a sleeve on said shaft, pinions carried by the sleeve at approximately right angles to the shaft, gear wheels loose on the shaft and meshing with the pinions, and a lever carrying pawl teeth for alternately engaging said gear wheels.

4. In combination with a driven shaft, two gears loosely mounted on the shaft, each forming a part of a separate driving mechanism, a sleeve rigidly mounted on said shaft and having radially extending arms formed thereon, a differential gear journaled on each of said arms and meshing with teeth formed on each of said loosely mounted gears, and holding means movable to hold one of said loosely mounted gears stationary and for simultaneously releasing the other.

5. A differential mechanism, comprising a driven shaft, two gears loosely mounted on said shaft, a differential pinion carried by said shaft and meshing with both said gears, and means for alternately engaging the gears and for thereby holding one against rotation and releasing the other.

In testimony whereof, I have hereunto subscribed my name this 1st day of February, 1913.

HORACE CHRISMAN.

Witnesses:
ANNA CLOHERTY,
ADA ROMIG.

Copies of this patent may be obtained for five cents each, by addressing the "Commissioner of Patents, Washington, D. C."